United States Patent
Basu et al.

(10) Patent No.: US 12,499,151 B2
(45) Date of Patent: *Dec. 16, 2025

(54) EMBEDDING BASED RETRIEVAL FOR IMAGE SEARCH

(71) Applicant: Google LLC, Mountain View, CA (US)

(72) Inventors: Suddha Kalyan Basu, San Jose, CA (US); Wei Fan, Sunnyvale, CA (US); Daniel Glasner, New York, NY (US); Sushrut Suresh Karanjkar, Fremont, CA (US); Thomas Richard Strohmann, Cupertino, CA (US); Shubhang Verma, Mountain View, CA (US); Manas Ashok Pathak, Mountain View, CA (US); Wenyuan Yin, Cupertino, CA (US); Sundeep Tirumalareddy, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/798,316

(22) Filed: Aug. 8, 2024

(65) Prior Publication Data

US 2024/0394319 A1    Nov. 28, 2024

Related U.S. Application Data

(63) Continuation of application No. 18/461,049, filed on Sep. 5, 2023, now Pat. No. 12,086,198, which is a (Continued)

(51) Int. Cl.
*G06F 16/50* (2019.01)
*G06F 16/538* (2019.01)
(Continued)

(52) U.S. Cl.
CPC .......... *G06F 16/583* (2019.01); *G06F 16/538* (2019.01); *G06F 16/587* (2019.01)

(58) Field of Classification Search
CPC .... G06F 16/532; G06F 16/538; G06F 16/583; G06F 16/587; G06F 16/58
See application file for complete search history.

(56) References Cited

U.S. PATENT DOCUMENTS

| | | | |
|---|---|---|---|
| 8,995,716 | B1 | 3/2015 | Zomet et al. |
| 2015/0161120 | A1 | 6/2015 | Preetham et al. |

(Continued)

FOREIGN PATENT DOCUMENTS

EP    3300002    3/2018

OTHER PUBLICATIONS

International Preliminary Report on Patentability for Application No. PCT/US2020/020459, mailed Sep. 9, 2022, 8 pages.

(Continued)

*Primary Examiner* — Kristopher Andersen
(74) *Attorney, Agent, or Firm* — DORITY & MANNING P.A.

(57) ABSTRACT

Methods, systems, and apparatus including computer programs encoded on a computer storage medium, for retrieving image search results using embedding neural network models. In one aspect, an image search query is received. A respective pair numeric embedding for each of a plurality of image-landing page pairs is determined. Each pair numeric embedding is a numeric representation in an embedding space. An image search query embedding neural network processes features of the image search query and generates a query numeric embedding. The query numeric embedding is a numeric representation of the image search query in the same embedding space. A subset of the image-landing page pairs having pair numeric embeddings that are closest to the (Continued)

query numeric embedding of the image search query in the embedding space are identified as first candidate image search results.

20 Claims, 5 Drawing Sheets

Related U.S. Application Data continuation of application No. 17/277,820, filed as application No. PCT/US2020/020459 on Feb. 28, 2020, now Pat. No. 11,782,998.

(51) Int. Cl.
*G06F 16/583* (2019.01)
*G06F 16/587* (2019.01)

(56) References Cited

U.S. PATENT DOCUMENTS

| | | |
|---|---|---|
| 2018/0314715 A1 | 11/2018 | Ramesh et al. |
| 2019/0236167 A1 | 8/2019 | Hu et al. |
| 2020/0380027 A1 | 12/2020 | Aggarwal et al. |
| 2021/0271707 A1 | 9/2021 | Lin et al. |

OTHER PUBLICATIONS

International Search Report and Written Opinion for PCT/US2020/020459, mailed on Oct. 9, 2020, 12 pages.
Karmakar et al, "Towards Semantic Image Search", 2016 Institute of Electrical and Electronics Engineers Tenth International Conference on Semantic Computing, Feb. 4, 2016, pp. 483-487.

EMBEDDING BASED RETRIEVAL FOR IMAGE SEARCH

PRIORITY CLAIM

This application is a continuation of U.S. application Ser. No. 18/461,049 having a filing date of Sep. 5, 2023, which is a continuation of U.S. application Ser. No. 17/277,820 having a filing date of Mar. 19, 2021, which is based upon and claims the right of priority under 35 U.S.C. § 371 to International Application No. PCT/US02020/020459 filed on Feb. 28, 2020, which are incorporated by reference herein in its entirety.

BACKGROUND

This specification generally relates to retrieving image search results.

Online search engines generally retrieve candidate resources, e.g., images, in response to received search queries to present search results identifying resources that are responsive to the search query. Search engines generally retrieve search results by a term-based retrieval system that identifies search results based on key terms of the search query. Search engines may retrieve the resources based on various factors.

Some conventional image search engines, i.e., search engines configured to identify images on landing pages, e.g., on webpages on the Internet, in response to received search queries, generate separate signals from the i) features of the image and ii) features of the landing page and then combine the separate signals according to a fixed weighting scheme that is the same for each received search query.

SUMMARY

This specification describes technologies for retrieving image search results in response to an image search query using a trained embedding neural network model.

In one aspect, receiving an image search query; determining a respective pair numeric embedding for each of a plurality of image-landing page pairs, each image-landing page pair including a respective image and a respective landing page for the respective image, wherein each pair numeric embedding is a numeric representation in an embedding space; processing features of the image search query using an image search query embedding neural network to generate a query numeric embedding of the image search query, and wherein the query numeric embedding is a numeric representation in the same embedding space; and identifying, as first candidate image search results for the image search query, image search results that identify a subset of the image-landing page pairs having pair numeric embeddings that are closest to the query numeric embedding of the image search query in the embedding space. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Retrieving image-search query pairs by evaluating closeness in an embedding space defined by embeddings generated by a trained embedding neural network model, as described in this specification, allows images to be provided in response to the image search query that are examples of the search query. That is, the images provided in response to the image search query respond to the image search query. Unlike conventional methods to retrieve resources, the embedding neural network model receives a single input that includes features of the image search query, landing page and the image identified by a given image search result and generates an embedding representation of the image search result in the same embedding space as a generated embedding representation of the received query. This embedding representation can model more general semantic relationships between features. Thus, the distance in the embedding space reflects the similarity of one point to another, and any query or search result can be represented as a point in that embedding space. This can allow relevant image search results to be effectively retrieved. Retrieval in the embedding space can be computationally efficient because fast algorithms can be developed to efficiently find nearest neighbors or approximately nearest neighbors in the embedding space. In some implementations, distances in the embedding space can be used for ranking. For example, given a query and a set of image-landing page pairs, the set of image-landing page pairs can be sorted and ranked by corresponding distances in the embedding space. Moreover, by making use of the embedding-based retrieval system in addition to a term-based retrieval system, the system can retrieve relevant candidate search results that do not fully match all the terms of the search query, which is beneficial for long or obscure search queries.

Having queries and image-landing page pairs in the same embedding space can enable features that requires identifying relationships between different queries and different landing pages. For example, the features can include one or more of the following: obtaining related queries based on a query, obtaining related documents based on a document, obtaining related queries based on a document, or obtaining related documents based on a query. These features can be supported by the same embedding neural network model, without a need for separate indexing system and retrieval system that are used in traditional approaches.

In some implementations, an embedding space for queries and image-landing page pairs in different languages can be simultaneously learned. The distances in the embedding space can be used to relate landing pages with similar content in different languages. The distances in the embedding space can be used to understand that queries in different languages have similar content. These connections provided by images can be obtained with the embedding neural network model. Images which are identical or similar may exist on landing pages that are in different languages. The embedding neural network model can help identify the connections by taking advantage of this language independent similarity in the embedding space.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
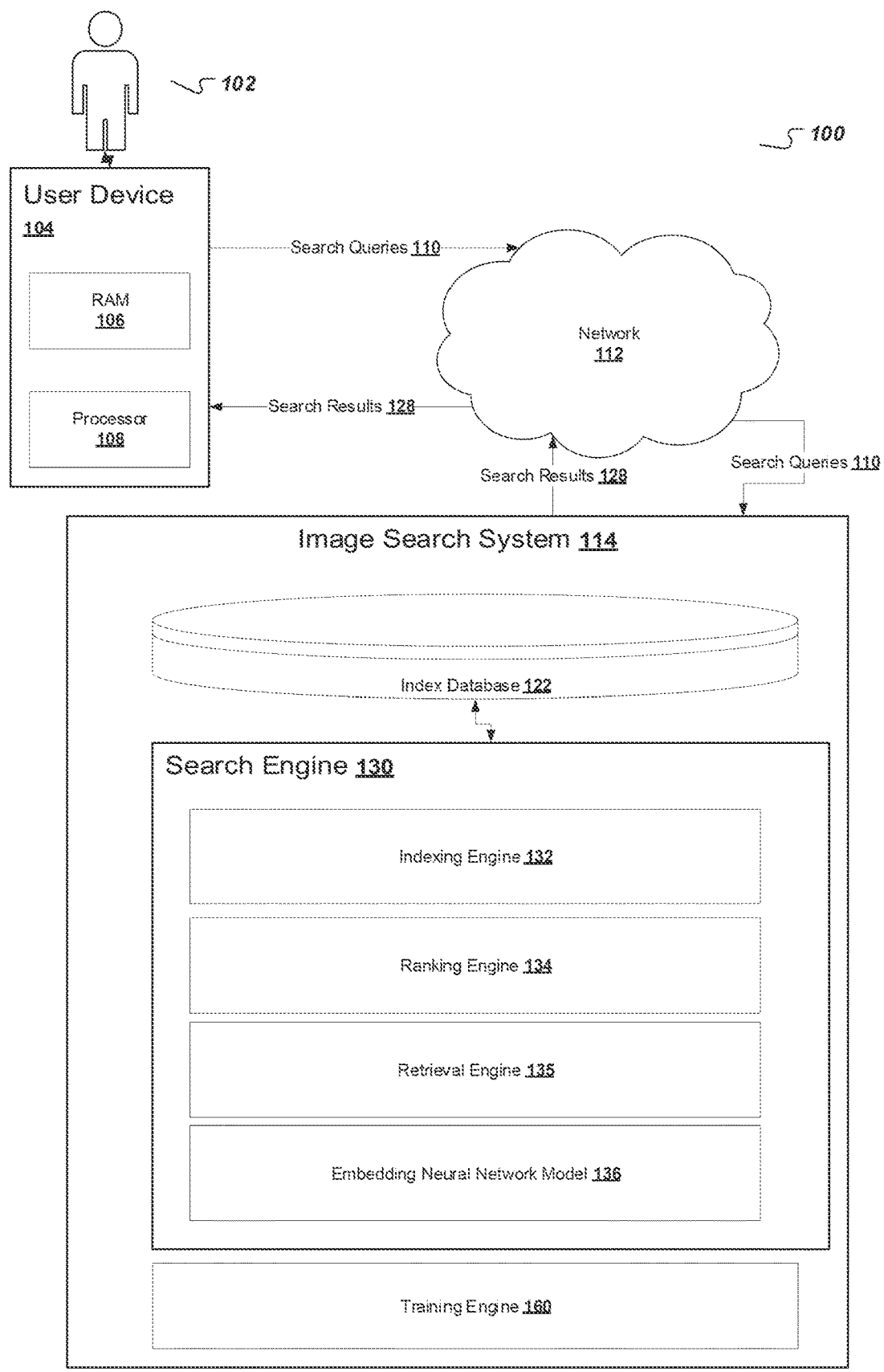
FIG. 1A is a block diagram of an example search system.

FIG. 1A shows an example image search system 114. The image search system 114 is an example of an information retrieval system in which the systems, components, and techniques described below can be implemented.

A user 102 can interact with the image search system 114 through a user device 104. For example, the user device 104 can be a computer coupled to the image search system 114 through a data communication network 112, e.g., local area network (LAN) or wide area network (WAN), e.g., the Internet, or a combination of networks. In some cases, the image search system 114 can be implemented on the user device 104, for example, if a user installs an application that performs searches on the user device 104. The user device 104 will generally include a memory, e.g., a random access memory (RAM) 106, for storing instructions and data and a processor 108 for executing stored instructions. The memory can include both read only and writable memory.

The image search system 114 is configured to search a collection of images. Generally the images in the collection are images that are found on web pages on the Internet or on a private network, e.g., an Intranet. A web page on which an image is found, i.e., in which an image is included, will be referred to in this specification as a landing page for the image.

The user 102 can submit search queries 110 to the image search system 114 using the user device 104. When the user 102 submits a search query 110, the search query 110 is transmitted through the network 112 to the image search system 114.

When the search query 110 is received by the image search system 114, a search engine 130 within the image search system 114 identifies image-landing page pairs that satisfy the search query 110 and responds to the query 110 by generating search results 128 that each identify a respective image-landing page pair satisfying the search query 110. Each image-landing page pair includes an image and the landing page on which the image is found. For example, the image search result can include a lower-resolution version of the image or a crop from the image and data identifying the landing page, e.g., the resource locator of the landing page, the title of the landing page, or other identifying information. The image search system 114 transmits the search results 128 through the network 112 to the user device 104 for presentation to the user 102, i.e., in a form that can be presented to the user 102.

The search engine 130 may include an indexing engine 132, a ranking engine 134 and a retrieval engine 135. The indexing engine 132 indexes image-landing page pairs, and adds the indexed image-landing page pairs to an index database 122. That is, the index database 122 includes data identifying images and, for each image, a corresponding landing page.

The index database 122 also associates the image-landing page pairs with (i) features of the images, i.e., features that characterize the images, and (ii) features of the landing pages, i.e., features that characterize the landing page. Examples of features of images and landing pages are described in more detail below.

The retrieval engine 135 identifies candidate image-landing page pairs for the search query 110. The candidate image-landing page pairs includes a subset of available image-landing page pairs, i.e., a subset of the pairs that are identified in the index database 122.

In particular, as part of identifying candidate image search results, the retrieval engine 135 can map the search query 110 and each of the image-landing page pairs to the same embedding space by using a trained embedding neural network model 136. The distance between an embedding of an image-landing page pair and the embedding of a search query 110 in the embedding space can reflect the relevance of the image-landing page pair to the search query 110. The retrieval engine 135 identifies, as candidate image search results, a subset of available image-landing page pairs that are closest to the search query in the embedding space. The candidate image search results can later be ranked by the ranking engine 134.

For each image-landing page pair, the retrieval engine 135 determines a pair numeric embedding which is a numeric representation of the image-landing page pair in an embedding space. In some implementations, the system can access an index database 122 that associates image-landing page pairs with corresponding previously generated pair numeric embeddings. In some other implementations, the system can process features of each image-landing page pair using a trained embedding neural network to generate the respective pair numeric embedding for the image-landing page pair at query time.

In some implementations, the retrieval engine 135 can include two or more retrieval systems that each generate a set of candidate image-landing page pairs. For example, in addition to the above discussed embedding-based retrieval system, the retrieval engine 135 can include a term-based retrieval system that identifies image-landing page pairs based on key terms. The retrieval engine 135 can merge retrieval results from the embedding-based retrieval system and retrieval results from the term-based retrieval system to generate the final set of candidate image-landing page pairs. By making use of the embedding-based retrieval system in addition to the term-based retrieval system, the retrieval engine 135 can retrieve relevant results that do not fully match all terms of the query. This benefit is useful for long or obscure queries.

The ranking engine 134 generates respective ranking scores for the candidate image-landing page pairs. The ranking engine 134 can generate relevance scores based on stored scores in the index database 122 or relevance scores that are computed at query time and then rank the candidate image-landing page pairs based on the respective ranking scores. The relevance score for a given image-landing page pair reflects the relevance of the image-landing page pair to the received search query 110, the quality of the given image-landing page pair, or both.

The embedding neural network model 136 can be any of a variety of kinds of embedding neural network models. For example, the embedding neural network model 1360 can be a deep machine learning model, e.g., a neural network that includes multiple layers of non-linear operations.

Retrieving candidate image-landing page pairs using an embedding neural network model is described in more detail below with reference to FIGS. 2 and 3.

To train the embedding neural network model 136 so that the embedding neural network model 136 can be used to accurately generate embedding representations for image-landing page pairs and search queries in the embedding space, the image search system 114 includes a training engine 160. The training engine 160 trains the embedding neural network model 136 on training data generated using image-landing page pairs that are already associated with ground truth or known search queries. Training the machine learning model will be described in greater detail below with reference to FIG. 4.

Figure 1B:
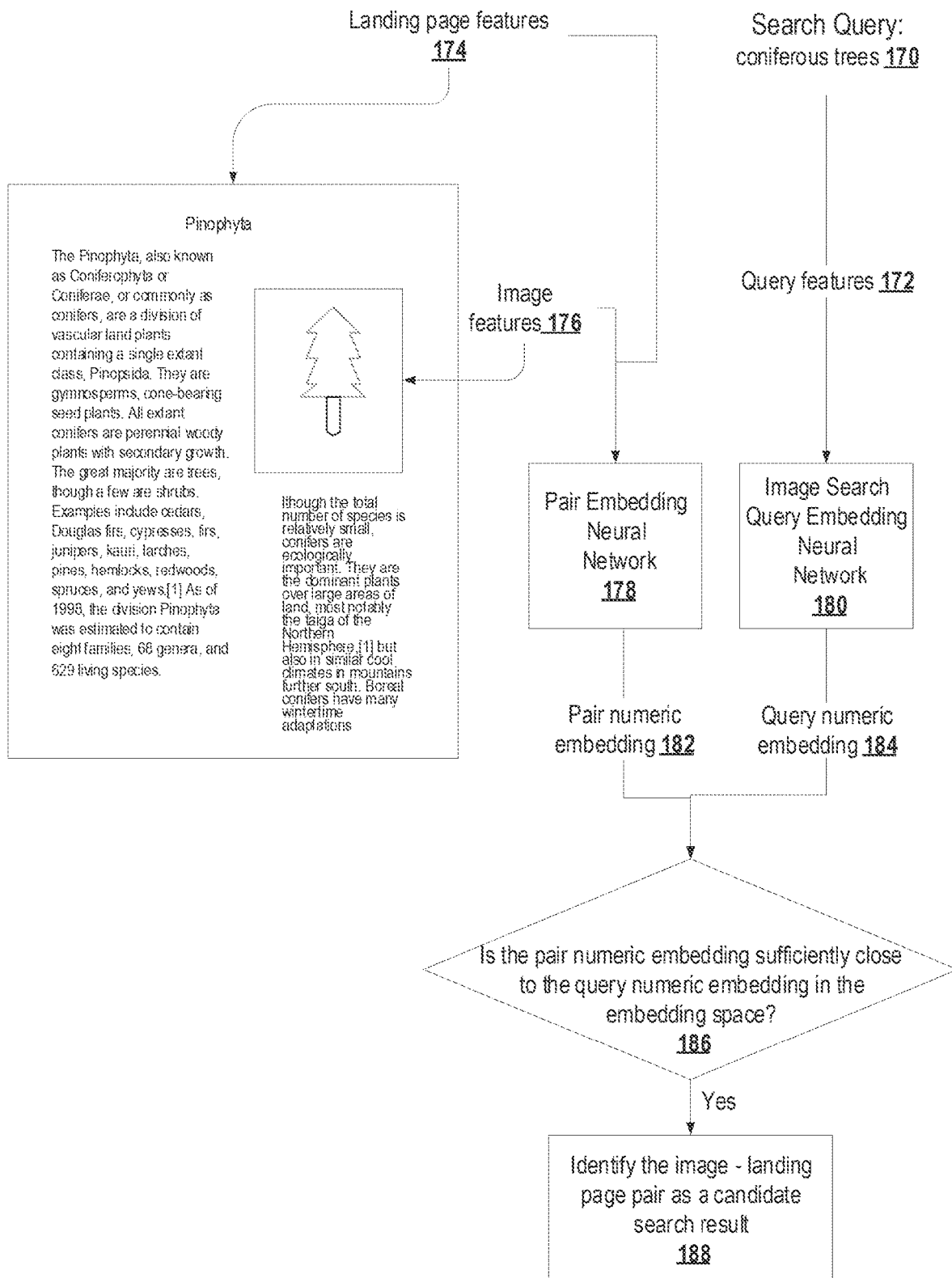
FIG. 1B shows an example of identifying an image-landing page pair as a candidate image search result for an image search query.

FIG. 1B shows an example of identifying an image-landing page pair as a candidate image search result for an image search query. In the example of FIG. 1B, the user submits an image search query 170 ("coniferous trees"). The system generates image query features 172 based on the user submitted image search query 170. Examples of query features 172 are described below with reference to FIG. 2.

The system also generates or obtains landing page features 174 for a landing page that is part of a particular image-landing page pair that is identified in the index database and image features 176 for the image in the particular image-landing page. Examples of landing page features 174 and image features 176 are described below with reference to FIG. 2. The system then provides the landing page feature 174 and the image features 176 as input to a pair embedding neural network 178. The system also provides the query feature 172 as input to an image search query embedding neural network 180.

The pair embedding neural network 178 receives input that includes features of the landing page and features of the image and generates a pair numeric embedding for the image-landing page pair. The pair numeric embedding is a numeric representation of the image-landing page pair in an embedding space.

The image search query embedding neural network 180 receives input that includes features of the image search query and generates a query numeric embedding of the image search query. The query numeric embedding is a numeric representation of the image search query in the same embedding space as the pair numeric embedding for the image-landing page pair.

The system then determines 186 whether the pair numeric embedding 182 is sufficiently close to the query numeric embedding 184 in the embedding space. For example, the system can identify K candidate image-landing page pairs that have pair numeric embeddings that are closest to the query numeric embedding out of the image-landing page pairs in the index. If the system determines that the pair numeric embedding 182 is sufficiently close to the query numeric embedding 184, the system identifies 188 the image-landing page pair as a candidate image search result. The candidate image search result can be later processed by the ranking engine 134.

Figure 2:
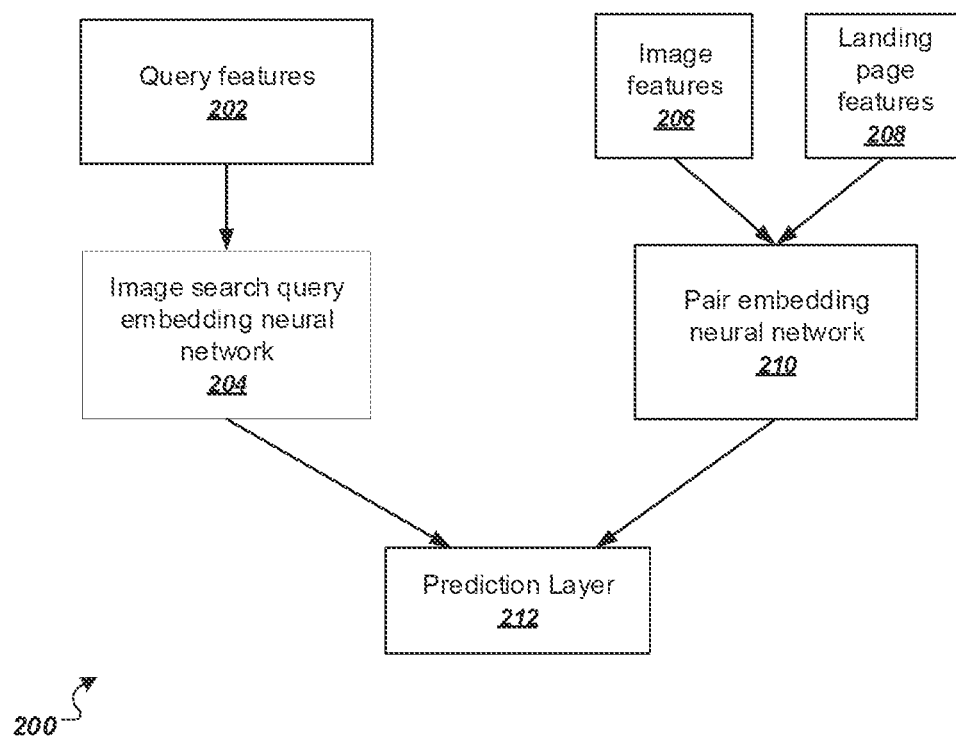
FIG. 2 illustrates an example architecture of an embedding neural network for generating a candidate image search result from an image-landing page pair and an image search query.

FIG. 2 illustrates an example architecture of an embedding neural network 200 for generating a candidate image search result from an image-landing page pair and an image search query. For each image-landing page pair and image search query, the embedding neural network 200 takes query features 202, image features 206 and landing page features 208 as input and can generate output that can help the system identify whether the image-landing page pair is a candidate image search result. The embedding neural network 200 includes two sub neural networks: image search query embedding neural network 204 and pair embedding neural network 210.

The image search query embedding neural network 204 takes as input the query features 202 and generates a query numeric embedding representation 184 of the search query. The query features 202 can include a plurality of features, such as, location features, text features, etc. The location features can characterize a location from which the image search query was submitted. The text features can include unigrams or bigrams of the image search query.

Generally, the image search query embedding neural network 204 can be a deep neural network that includes a number of embedding subnetworks for each feature of the plurality of query features. Each embedding subnetwork can generate embedding representations for examples of a corresponding feature. For example, a location embedding subnetwork can generate embedding representations for the location features and a text embedding subnetwork can generate embedding representations for query unigrams or bigrams. For example, the unigrams or bigrams in text features can be represented as individual tokens. An embedding of a unigram or a bigram can be calculated using a look-up table. The look-up table can be an embedding weight matrix and can be a shortcut for matrix multiplication in order to improve efficiency. The look-up table can be trained similar to training parameters in weight matrix. The output of the look-up table can be a one-dimensional integer vector. For example, the word "cat" can be represented as a token 543. Then the embedding for the word "cat" can be the values in the 543th row of the look-up table, e.g., a vector [1 4 6 7 9] with an embedding dimension or length of 5. After calculating the embedding for each token, the numerical embedding representation of a text feature can be an average value of the embeddings of all the tokens.

The output of each embedding subnetwork can be a numeric vector. For example, the numeric vector can be a vector of length 128 with floating numbers.

Each embedding subnetwork is previously trained to generate embedding vectors for query features of a particular type. The trained subnetwork can map different query features of a particular type into a common space. For example, the text embedding subnetwork can map different kinds of query text into a common space by generating corresponding embedding vectors. A query text [red hats] can be mapped to a numeric vector [0.1, −0.2, 0.0, . . . , −0.3, 0.2] that is a vector of length 128. These embeddings can model more general semantic relationships and can be efficiently used in image search systems.

The outputs of each embedding subnetwork are merged together through operations such as concatenation or addition to generate an embedding representation for the image search query. For example, suppose the output from the location embedding subnetwork is a vector of length 128 and the output from the text embedding subnetwork is also a vector of length 128, these outputs can be concatenated together and can generate a vector of length 256 that summarizes the embedding representations of the text features and location features of the image search query.

In some implementations, the merged features are processed through one or more fully connected layers that further extract features from the merged features in order to generate a final query numerical embedding 184 for the image search query.

The pair embedding neural network 210 takes as input the image features 206 and landing page features 208 and generates a pair numeric embedding 182 of the image-landing page pair. The image features 206 and landing page features 208 can be from an index database 122 or from other data maintained by the system that associates images and landing pages with corresponding features.

The image features 206 can include one or more of pixel data of the image or an embedding of the image that characterizes content of the image. For example, the image features can include all or part of the pixels of an image that can represent raw content information of an image. As another example, the image features 206 can include embedding vectors that represent the content of the image. These embedding vectors to represent the image may be derived by processing the image through another embedding neural network. Alternatively, the embedding vectors can be generated through other image processing techniques for feature extraction. Example feature extraction techniques include edge, corner, ridge and blob detection.

In some implementations, embedding vectors of the image content can be previously generated and saved in an index database. Therefore, the embedding representation of an image content can be directly obtained by accessing the index database without the need to compute it within the embedding neural network 200.

The image features 206 can also include data identifying a domain of an image, and/or text from a Uniform Resource Locator (URL) of an image, e.g., unigrams or bigrams. The text features of an image and the text feature from a search query both include unigrams or bigrams. Therefore, both of them can be later mapped to a same embedding space through the embedding neural network 200. The corresponding embedding representations of relevant text features are closer to each other in the embedding space than those of the less relevant or irrelevant text features.

The landing page features 208 can include one or more of text from a title of the landing page, salient terms that appear on the landing page, text from a URL of the landing page and data identifying a domain of the landing page. Additionally, examples of features extracted from the landing page can include the date the page was first crawled or updated, data characterizing the author of the landing page, the language of the landing page, keywords representing the content of the landing page, features of the links to the image and landing page such as the anchor text or source page for the links, features that describe the context of the image in the landing page and so on.

The landing page features 208 can also include features extracted from the landing page that describe the context of the image in the landing page. Examples of features extracted from the landing page that describe the context of the image in the landing page include data characterizing the location of the image within the landing page, the prominence of the image on the landing page, textual descriptions of the image on the landing page etc. The location of the image within the landing page can be pin-pointed using pixel-based geometric location in horizontal and vertical dimensions, user-device based length (e.g., in inches) in horizontal and vertical dimensions, an HTML/XML DOM-based XPATH-like identifier, a CSS-based selector, etc. The prominence of the image on the landing page can be measured using relative size of the image as displayed on a generic device and on a specific user device. Textual descriptions of the image on the landing page can include alt-text labels for the image, text surrounding the image, and so on.

Similar to the image search query embedding neural network 204, the pair embedding neural network 210 can be a deep neural network that includes a number of embedding subnetworks for each feature of the plurality of image-landing page pair features. Each embedding subnetwork can generate embedding representations for examples of a corresponding feature. For example, a domain embedding subnetwork can generate embedding representation for page domain features and a text embedding subnetwork can generate embedding for text data of an image URL. The output of each embedding subnetwork can be a numeric vector. For example, the numeric vector can be a vector of length 128 with floating numbers.

Similar to the image search query embedding neural network 204, the outputs of each embedding subnetworks are merged together through operations such as concatenation or addition to generate an embedding representation for the image-landing page pair. For example, outputs from a plurality of embedding subnetworks can be a plurality of embedding vectors, each having length 128, for page title unigrams/bigrams, page salient terms, page URL unigrams/bigrams, image URL unigrams/bigrams, and image domain, etc. In some implementations, an embedding vector of length 128 for the image content can be obtained from the index database. The plurality of N embedding vectors can be concatenated together and can generate a vector of length 128×N that summarizes embedding representations of features of the image-landing page pair. Similar to the image search query embedding neural network 204, in some implementations, the merged features are processed through one or more fully connected layers that further extract features from the merged features in order to generate a final pair numeric embedding 182 for the image-landing page pair. The pair numerical embedding 182 and the query numerical embedding 184 are in the same embedding space.

In some implementations, the outputs of the embedding subnetworks can be partially merged or not merged. Instead of merging the outputs of embedding subnetworks and generating a single embedding representation for the image-landing page pair, the outputs of the embedding subnetworks can be merged into two or more embedding representations for the image-landing page pair. Accordingly, the corresponding final pair numeric embedding 182 can include two or more embedding representations that are in the same embedding space as the query numerical embedding 184.

In some implementations, the image search query embedding neural network 204 and the pair embedding neural network 210 share at least some parameters. For example, two or more of the subnetworks, such as a query text embedding subnetwork, a landing page title embedding subnetwork, a landing page salient terms embedding subnetwork, a landing page URL embedding subnetwork and an image URL embedding network, etc., can share parameters because these features are drawn from a same vocabulary. Two neural networks sharing parameters refers to the two neural networks being constrained to have the same value for each parameter that is shared.

In some implementations, the image search query embedding neural network 204 and the pair embedding neural network 210 can be trained jointly to facilitate training of the shared parameters between these networks. More details about training the embedding neural network will be described in greater detail below with reference to FIG. 4.

The prediction layer 212 compares the pair numeric embedding 182 with the query numeric embedding 184 in the same embedding space. In some implementations, the prediction layer 212 can output a distance value that can measure the closeness of the pair numeric embedding 182 and the query numeric embedding 184. For example, the prediction layer 212 can include a dot product between the pair numeric embedding 182 and the query numeric embedding 184.

The output from the prediction layer 212 can be used differently during training of the embedding neural network 200 and during an image search. During an image search, the retrieval engine 135 can identify candidate image search results for a search query based on the output from the prediction layer 212 that measures the closeness of embedding representations of image-landing page pairs to the embedding representation of the search query. When training the embedding neural network 200, the training engine 160 can jointly train the pair embedding neural network and the image search query embedding neural network to minimize a loss function that depends on the output from the prediction layer 212, e.g., the dot product.

Figure 3:
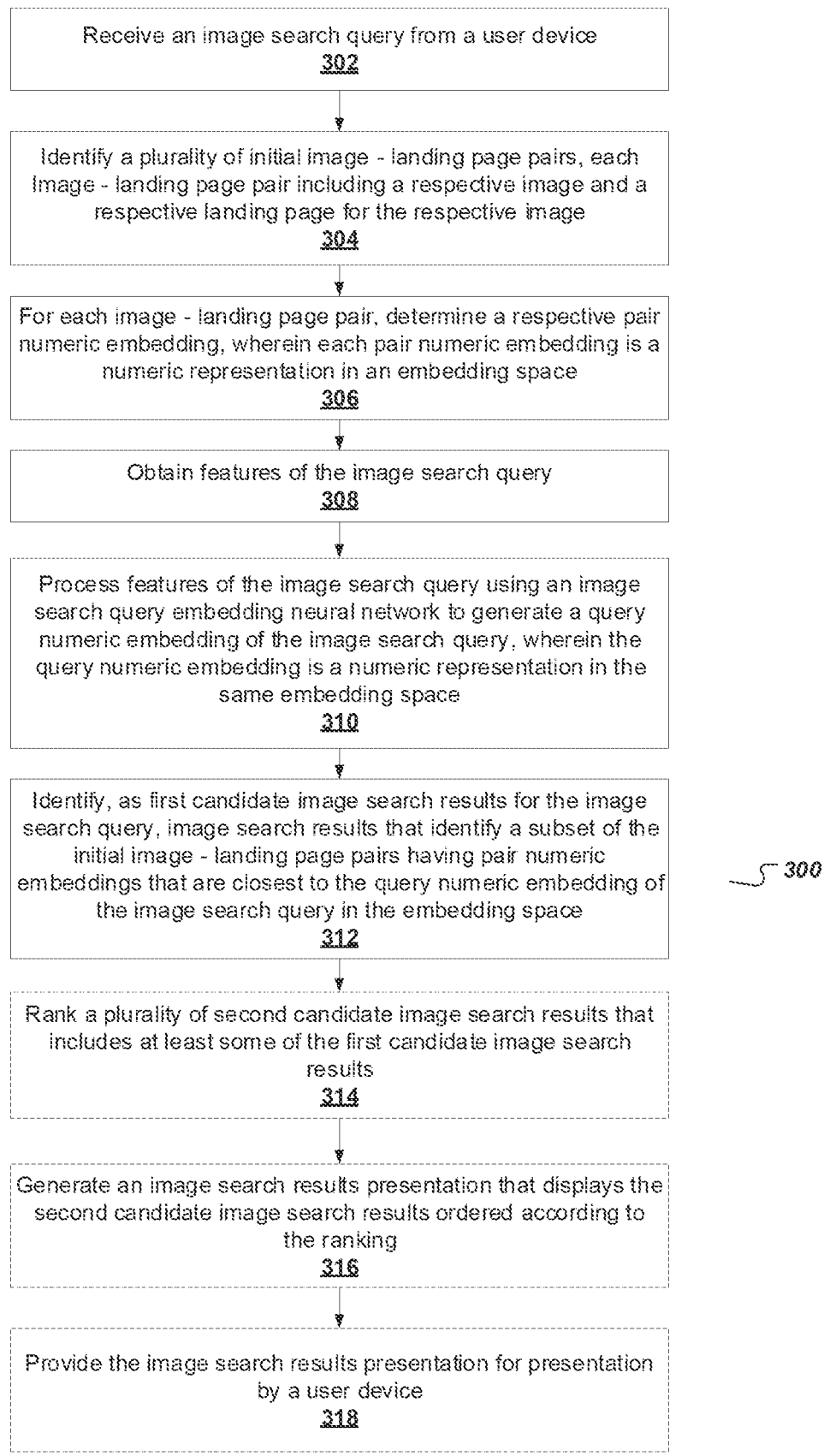
FIG. 3 is a flowchart of an example process for generating image search results from an image search query.

FIG. 3 is a flowchart of an example process 300 for generating image search results from an image search query. For convenience, the process 300 will be described as being performed by a system of one or more computers located in one or more locations. For example, an image search system, e.g., the image search system 114 of FIG. 1A, appropriately programmed in accordance with this specification, can perform the process 300.

The image search system receives an image search query from a user device (302). In some cases, the image search query is submitted through a dedicated image search interface provided by the image search system, i.e., a user interface for submitting image search queries. In other cases, the search query is submitted through a generic Internet search interface and image search results are displayed in response to the image search query along with other kinds of search results, i.e., search results that identify other types of content available on the Internet.

Upon receiving the image search query, the image search system identifies initial image-landing page pairs (304). For example, the system can identify the initial image-landing page pairs from the pairs indexed in a search engine index database based on signals that measure the quality of the pairs, the relevance of the pairs to the search query, or both.

For each image-landing page pair, the system determines a respective pair numeric embedding (306) which is a numeric representation of the image-landing page pair in an embedding space. In some implementations, the system can access an index database that associates image-landing page pairs with corresponding pair numeric embeddings that have been previously generated using a pair embedding neural network. This can save image search time because the pair numeric embeddings have been previously computed and stored.

In some other implementations, the system can process features of each image-landing page pair using a pair embedding neural network to generate the respective pair numeric embedding for the image-landing page pair. The features of each image-landing page pair can include features of the image and features of the landing page. These features can be from the index database or from other data maintained by the system that associates images and landing pages with corresponding features. These features may be represented categorically or discretely. Furthermore, additional relevant features can be created through pre-existing features. For example, a system may create relationships between one or more features through a combination of addition, multiplication, or other mathematical operations.

The system obtains features of the image search query (308) and processes features of the image search query using an image search query embedding neural network (310). The image search query embedding neural network can generate a query numeric embedding of the image search query. The generated query numeric embedding is a numeric representation of the image search query in the same embedding space as the pair numeric representation of the image-landing page pair.

The system identifies a subset of the initial image-landing page pairs as first candidate image search results (312). The subset of the initial image-landing page pairs have pair numeric embeddings that are closest to the query numeric embeddings of the image search query in the embedding space. For example, among the initial image-landing page pairs, top K image-landing page pairs that have embedding representations closest to the embedding representation of the search query can be selected using nearest neighbor search.

Feature embeddings can model more general semantic relationships between features. The closeness of the numeric embeddings of the features can be trained to measure a relevance of the candidate image search result to the image search query. In some implementations, the closeness of the numeric embeddings can be trained to measure a likelihood of a user submitting the search query would interact with the search result. The numeric embeddings that are closer to each other indicates the user submitting the search query would find the candidate image search result more relevant and interact with it. Training the embedding neural network to generate numeric embeddings will be described below with reference to FIG. 4.

The first candidate image search results generally include much fewer candidates than the initial image search results. For example, the number of first candidate image search results can be limited to less than on the order of one hundred results. This is much fewer than the initial image search results, which can be thousands or millions of image search results.

In some implementations, upon receiving the first candidate image search results, the system then generates a plurality of second candidate image search results that includes at least some of the first candidate image search results. For example, the system may obtain other candidates retrieved by a term-based retrieval system that is based on key terms. The system can merge the term-based candidates and the embedding-based candidates and send the merged candidates for a second round of relevance scoring. After the second round of relevance scoring, the second candidate image search results can be selected from the embedding-based first candidate image search results and the term-based candidate image search results.

The system ranks the plurality of second candidate image search results (314) by using the ranking engine. The ranking engine can generate relevance scores based on stored scores in the index database or computed at query time, and ranks the plurality of second image-landing page pairs based on the respective ranking scores. The relevance score for a candidate image-landing page pair reflects the relevance of the image-landing page pair to the received search query, the quality of the given image-landing page pair, or both. The system ranks the image search results based on the relevance scores for the corresponding image-landing page pairs.

The system generates an image search results presentation that shows the image search results ordered according to the ranking (316) and provides the image search results presentation for presentation (318) by sending the search result presentation through a network to the user device from which the image search query was received in a form that can be presented to a user.

Figure 4:
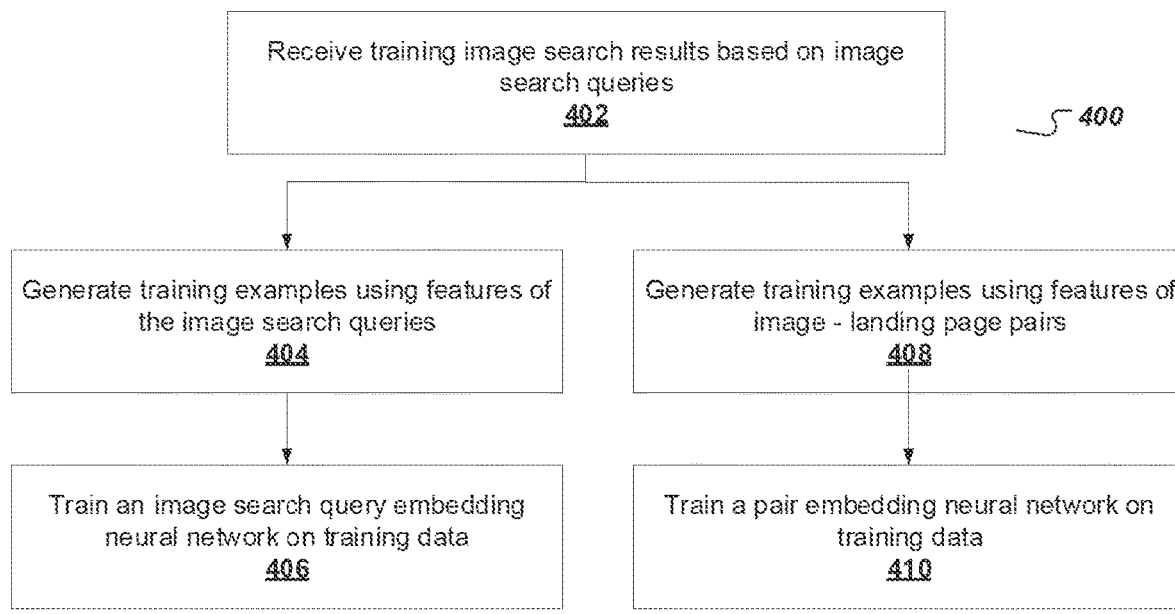
FIG. 4 is a flowchart of an example process for training an embedding neural network.

FIG. 4 is a flowchart of an example process 400 for training an embedding neural network. For convenience, the process 400 will be described as being performed by a system of one or more computers located in one or more locations. For example, an image search system, e.g., the image search system 114 of FIG. 1A, appropriately programmed in accordance with this specification, can perform the process 400.

The system receives a set of training image search queries, and, for each training image search query, training image search results for the query (402). Each training image search result can be identified as a positive training example or a negative training example. In some implementations, the system identifies the training image search query and the training image-landing page pair as a positive training example when a user interacted with a search result identifying the training image-landing page pair after submitting the training image search query.

For each of the training image search queries, the system generates training examples using features of the image search queries (404). For each of the training image search results, the system generates training examples using features of image-landing page pairs (408). For each training pair, the system identifies (i) features of the image search query (ii) features of the image and (iii) features of the landing page. Extracting, generating and selecting features may occur prior to training or using other embedding models. Examples of features are described above with reference to FIG. 2.

The system trains a pair embedding neural network (410) and trains an image query embedding neural network (406) jointly. The system jointly trains the two neural networks to minimize a loss function that depends on a dot product between (i) a query numeric embedding for a training image search query and (ii) a pair numeric embedding for a training image-landing page pair. For example, the loss function can encourage dot products to be higher when the training image search query and the training image-landing page pair have been identified as a positive training example than when the training image search query and the training image-landing page pair have been identified as a negative training example.

In some implementations, the image search query embedding neural network can be previously trained for other embedding representation tasks. For example, the image search query embedding neural network can be implemented with a look-up table with parameters that are previously determined or trained. The numeric representations of the training image search queries can be calculated by indexing the look-up table using token representations of the training image search queries. In some implementations, the pair embedding neural network can be previously trained for other embedding representation tasks.

In some implementations, the pair embedding neural network and the image search query embedding neural network can share at least some parameters. For example, the pair embedding neural network and the image search query embedding neural network may share parameters corresponding to any features that are drawn from a same vocabulary. The shared neural network parameters can be effectively trained by the joint training method discussed above.

In some implementations, the system can implement the loss function using any of a variety of available loss functions in training the embedding neural network model in order to improve effective utilization of the large amount of data that is available. Examples of loss functions that can be used to train the model include softmax with cross-entropy loss, sampled softmax loss (Jean, Sébastien, et al. "On using very large target vocabulary for neural machine translation." arXiv preprint arXiv:1412.2007. 2014), contrastive loss functions or a combination of two or more of them.

In some implementations, the system can train the embedding neural network model in several stages and the system can implement different kinds of loss functions at each stage of the training process. For example, the system can use a softmax loss function in a first stage, and can use a contrastive loss function or an asymmetric scaled sigmoid loss function in the following stages. In some implementations, in one or more stages following the first stage, hard negative samples, e.g., training samples that have large loss values in one or more previous training stages, can be used during training to improve convergence speed of the training process or to improve the performance of a final model that is being trained.

For example, the system receives a set of 4096 training image search queries, and, for each training image search query $query_i$, an image search result $SelectedImage_i$, i.e., a selected image-landing page pair, for the query. Here, the index i=1, 2, . . . , 4096. For each training image search query $query_i$, the system generates one positive training example ($query_i$, $SelectedImage_i$) and generates 4095 negative training examples ($query_j$, $SelectedImage_j$), where i≠j. During training, for each positive or negative training example, the embedding neural network can output a dot product that can be normalized to a range of [0, 1] by a softmax function. Then the system can compute a sampled softmax loss for each training image search query $query_i$ using the normalized dot products computed from its corresponding 4095 negative training examples and one positive training example. Instead of computing the softmax loss over all the 4096 training image search queries, the sampled softmax loss only takes into account a subset of training examples to calculate the loss because the number of training image search queries is very large. The overall loss is the sum of loss computed for each of the 4096 training image search queries.

The system trains the embedding neural network by minimizing the loss function. For example, the system may train the embedding neural network model to determine trained values of the weights of the neural network from initial values of the weights by repeatedly performing a neural network training procedure to compute a gradient of the loss function with respect to the weights, e.g., using backpropagation, and determining updates to the weights from the gradient, e.g., using the update rule corresponding to the neural network training procedure.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   receiving, by a computing system comprising one or more processors, an image search query;
   generating, by the computing system, a respective pair numeric embedding for each of a plurality of image-landing page pairs, wherein each image-landing page pair comprises a respective image and a respective landing page for the respective image, wherein each pair numeric embedding is a numeric representation in an embedding space generated by processing the image-landing page pair with a pair embedding neural network, wherein each pair numeric embedding is generated based on one or more features of the respective image and one or more features of the respective landing page, wherein the pair embedding neural network comprises a plurality of embedding subnetworks for different image-landing page feature types, wherein outputs of the plurality of embedding subnetworks are merged to generate the respective pair numeric embedding, wherein merging comprises concatenating vectors of the outputs of the plurality of embedding subnetworks;
   processing, by the computing system, features of the image search query using an image search query embedding neural network to generate a query numeric embedding of the image search query, and wherein the query numeric embedding is a numeric representation in a same embedding space, wherein the pair embedding neural network and the image search query embedding neural network were jointly trained based a training dataset comprising a plurality of training image search queries and a plurality of training image search results, wherein each of the plurality of training image search results is associated with one or more respective training images search queries of the plurality of training image search queries;
   identifying, as first candidate image search results for the image search query and by the computing system, image search results that identify a subset of the image-landing page pairs having pair numeric embeddings that are closest to the query numeric embedding of the image search query in the embedding space; and
   providing, by the computing system, at least a subset of the image search results for display in a search interface.

2. The method of claim 1, further comprising:
   ranking, by the computing system, a plurality of second candidate image search results that comprises at least some of the first candidate image search results;
   generating, by the computing system, an image search results presentation that displays the second candidate image search results ordered according to the ranking; and
   providing, by the computing system, the image search results presentation for presentation by a user device.

3. The method of claim 1, wherein identifying, as first candidate image search results for the image search query and by the computing system, the image search results comprises:
   determining a distance in an embedding space between the image search query embedding and each of the plurality of pair numeric embeddings.

4. The method of claim 1, wherein identifying, as first candidate image search results for the image search query and by the computing system, the image search results is determined by a retrieval engine of the computing system.

5. The method of claim 1, wherein the image search query embedding neural network comprises a deep neural network that comprises a number of embedding subnetworks for each feature of a plurality of query features.

6. The method of claim 1, further comprising:
storing, by the computing system, the image search query and the at least the subset of the image search results in an index database.

7. The method of claim 1, wherein the image search query embedding neural network and the pair embedding neural network are separate neural networks.

8. The method of claim 1, further comprising:
retrieving, using a term-based retrieval system, a set of image-page pairs based on key terms of the image search query.

9. The method of claim 8, further comprising:
providing, by the computing system, the set of image-page pairs based on key terms of the image search query for display merged with the at least the subset of the image search results for display in the search interface.

10. The method of claim 1, wherein the respective landing page comprises a web page on which the respective image is found.

11. A computing system for performing an image search, the system comprising:
one or more processors; and
one or more non-transitory computer-readable media that collectively store instructions that, when executed by the one or more processors, cause the computing system to perform operations, the operations comprising:
receiving an image search query;
generating a respective pair numeric embedding for each of a plurality of image-landing page pairs, wherein each image-landing page pair comprises a respective image and a respective landing page for the respective image, wherein each pair numeric embedding is a numeric representation in an embedding space generated by processing the image-landing page pair with a pair embedding neural network, wherein each pair numeric embedding is generated based on one or more features of the respective image and one or more features of the respective landing page, wherein the pair embedding neural network comprises a plurality of embedding subnetworks for different image-landing page feature types, wherein outputs of the plurality of embedding subnetworks are merged to generate the respective pair numeric embedding, wherein each of the plurality of embedding subnetworks generates embedding representations for image-landing page features of a particular type, wherein merging comprises concatenating vectors of the outputs of the plurality of embedding subnetworks;
processing features of the image search query using an image search query embedding neural network to generate a query numeric embedding of the image search query, and wherein the query numeric embedding is a numeric representation in the same embedding space, wherein the pair embedding neural network and the image search query embedding neural network were jointly trained based a training dataset comprising a plurality of training image search queries and a plurality of training image search results, wherein each of the plurality of training image search results is associated with one or more respective training images search queries of the plurality of training image search queries;
identifying, as first candidate image search results for the image search query, image search results that identify a subset of the image-landing page pairs having pair numeric embeddings that are closest to the query numeric embedding of the image search query in the embedding space; and
providing at least a subset of the image search results for display in a search interface.

12. The system of claim 11, wherein the features of the image search query comprise data characterizing a location from which the image search query was submitted.

13. The system of claim 11, wherein the features of the image search query comprise text of the image search query.

14. The system of claim 11, wherein features of each image-landing page pair comprises a combination of features of the landing page and features of the image.

15. The system of claim 11, wherein the respective pair numeric embedding is descriptive of semantic relationships between features of a respective landing page.

16. The system of claim 11, further comprising:
storing the respective pair numeric embeddings for each of a plurality of image-landing page pairs in an index database, wherein the index database associates image-landing page pairs with corresponding pair numeric embeddings that have been generated for the image-landing page pairs using the pair embedding neural network.

17. One or more non-transitory computer-readable media that collectively store instructions that, when executed by one or more computing devices, cause the one or more computing devices to perform operations, the operations comprising:
receiving an image search query;
generating a respective pair numeric embedding for each of a plurality of image-landing page pairs, wherein each image-landing page pair comprises a respective image and a respective landing page for the respective image, wherein each pair numeric embedding is a numeric representation in an embedding space generated by processing the image-landing page pair with a pair embedding neural network, wherein each pair numeric embedding is generated based on one or more features of the respective image and one or more features of the respective landing page, wherein the pair embedding neural network comprises a plurality of embedding subnetworks for different image-landing page feature types, wherein outputs of the plurality of embedding subnetworks are merged to generate the respective pair numeric embedding, wherein merging comprises concatenating vectors of the outputs of the plurality of embedding subnetworks;
processing features of the image search query using an image search query embedding neural network to generate a query numeric embedding of the image search query, and wherein the query numeric embedding is a numeric representation in the same embedding space, wherein the pair embedding neural network and the image search query embedding neural network were jointly trained based a training dataset comprising a plurality of training image search queries and a plurality of training image search results, wherein each of the plurality of training image search results is associated with one or more respective training images search queries of the plurality of training image search queries;

identifying, as first candidate image search results for the image search query, image search results that identify a subset of the image-landing page pairs having pair numeric embeddings that are closest to the query numeric embedding of the image search query in the embedding space; and providing at least a subset of the image search results for display in a search interface.

18. The one or more non-transitory computer-readable media of claim 17, wherein the operations further comprise: adjusting one or more parameters of the pair embedding neural network based at least in part on a loss function.

19. The one or more non-transitory computer-readable media of claim 17, wherein the plurality of training image search results comprise one or more positive training examples and one or more negative training examples.

20. The one or more non-transitory computer-readable media of claim 19, wherein the one or more positive training examples are descriptive of a training image-landing page pair associated with a search result interacted with by a user after submitting a respective training image search query.

* * * * *